United States Patent
Lv et al.

(10) Patent No.: US 9,969,857 B2
(45) Date of Patent: May 15, 2018

(54) SINGLE-SCREW EXTRUSION DESULFURIZATION AND POST-PROCESSING SYSTEM, AND METHOD FOR PREPARING RECLAIMED RUBBER

(71) Applicants: Baiyuan Lv, Shandong (CN); Xiaolong Lv, Shandong (CN)

(72) Inventors: Baiyuan Lv, Shandong (CN); Xiaolong Lv, Shandong (CN)

( * ) Notice: Subject to any disclaimer, the term of this patent is extended or adjusted under 35 U.S.C. 154(b) by 0 days. days.

(21) Appl. No.: 15/123,644

(22) PCT Filed: Nov. 5, 2014

(86) PCT No.: PCT/CN2014/090358
§ 371 (c)(1),
(2) Date: Sep. 4, 2016

(87) PCT Pub. No.: WO2015/131526
PCT Pub. Date: Sep. 11, 2015

(65) Prior Publication Data
US 2017/0037216 A1    Feb. 9, 2017

(30) Foreign Application Priority Data
Mar. 6, 2014    (CN) .......................... 2014 1 0080452

(51) Int. Cl.
*B01J 19/00*        (2006.01)
*B01J 19/18*        (2006.01)
(Continued)

(52) U.S. Cl.
CPC ........... *C08J 11/12* (2013.01); *B01J 19/1812* (2013.01); *B29B 7/422* (2013.01); *B29B 7/426* (2013.01);
(Continued)

(58) Field of Classification Search
CPC ........ B01J 19/00; B01J 19/18; B01J 19/1812; B29B 7/00; B29B 7/30; B29B 7/34;
(Continued)

(56) References Cited

U.S. PATENT DOCUMENTS 3,869,111 A    3/1975   Matsuoka
3,929,323 A    12/1975  Smith

FOREIGN PATENT DOCUMENTS

CN    101811360    8/2010
CN    201659682    12/2010
(Continued)

OTHER PUBLICATIONS

Machine translation of CN 203079895 U, which was published on Jul. 24, 2013 and provided with IDS filed Dec. 22, 2017.*

(Continued)

*Primary Examiner* — Natasha E Young
(74) *Attorney, Agent, or Firm* — McDonnell Boehnen Hulbert & Berghoff LLP; Michael D. Clifford

(57) ABSTRACT

A single-screw extrusion desulfurization and post-processing system and a method for preparing reclaimed rubber. The single-screw extrusion desulfurization and post-processing system comprises: a single-screw desulfurization device, a single-screw post-processing device and a closed connection device for connecting the single-screw desulfurization device and the single-screw post-processing device, the single-screw post-processing device includes a post-processing feeding unit and a post-processing unit which are connected with each other, and a post-processing screw running through the post-processing feeding unit and the post-processing unit.

20 Claims, 2 Drawing Sheets

(51) Int. Cl.

| | | |
|---|---|---|
| *B29B 7/00* | (2006.01) | |
| *B29B 7/30* | (2006.01) | |
| *B29B 7/34* | (2006.01) | |
| *B29B 7/38* | (2006.01) | |
| *B29B 7/40* | (2006.01) | |
| *B29B 7/42* | (2006.01) | |
| *B29C 47/00* | (2006.01) | |
| *B29C 47/08* | (2006.01) | |
| *B29C 47/36* | (2006.01) | |
| *B29C 47/38* | (2006.01) | |
| *B29C 47/58* | (2006.01) | |
| *B29C 47/60* | (2006.01) | |
| *B29C 47/62* | (2006.01) | |
| *B29C 47/78* | (2006.01) | |
| *B29C 47/80* | (2006.01) | |
| *B29C 47/82* | (2006.01) | |
| *B29C 47/84* | (2006.01) | |
| *B29K 21/00* | (2006.01) | |
| *B29K 105/00* | (2006.01) | |
| *B29K 105/26* | (2006.01) | |
| *C08C 3/02* | (2006.01) | |
| *C08J 11/10* | (2006.01) | |
| *C08J 11/12* | (2006.01) | |
| *C08L 17/00* | (2006.01) | |
| *B29B 17/04* | (2006.01) | |
| *B29B 7/60* | (2006.01) | |
| *B29B 7/74* | (2006.01) | |
| *C08C 3/00* | (2006.01) | |
| *C08J 11/00* | (2006.01) | |
| *C08J 11/04* | (2006.01) | |
| *B29B 7/48* | (2006.01) | |

(52) U.S. Cl.
CPC ............. *B29B 7/428* (2013.01); *B29B 7/429* (2013.01); *B29B 7/60* (2013.01); *B29B 7/7495* (2013.01); *B29B 17/04* (2013.01); *B29C 47/0004* (2013.01); *B29C 47/365* (2013.01); *B29C 47/366* (2013.01); *B29C 47/385* (2013.01); *B29C 47/605* (2013.01); *B29C 47/802* (2013.01); *B29C 47/822* (2013.01); *B29C 47/842* (2013.01); *C08C 3/02* (2013.01); *C08J 11/10* (2013.01); *C08L 17/00* (2013.01); *B29B 7/484* (2013.01); *B29C 47/6087* (2013.01); *B29C 47/625* (2013.01); *B29K 2021/00* (2013.01); *B29K 2105/26* (2013.01); *C08J 2317/00* (2013.01); *Y02W 30/625* (2015.05)

(58) Field of Classification Search
CPC .... B29B 7/38; B29B 7/40; B29B 7/42; B29B 7/422; B29B 7/426; B29B 7/428; B29B 7/429; B29B 7/48; B29B 7/484; B29B 7/58; B29B 7/60; B29B 7/74; B29B 7/7476; B29B 7/7495; B29B 17/00; B29B 17/04; B29K 2021/00; B29K 2105/00; B29K 2105/26; C08C 3/00; C08C 3/02; C08J 11/00; C08J 11/04; C08J 11/10; C08J 11/12; C08J 2017/00; C08L 17/00; Y02W 30/00; Y02W 30/50; Y02W 30/62; Y02W 30/625
See application file for complete search history.

(56) References Cited

FOREIGN PATENT DOCUMENTS

| | | |
|---|---|---|
| CN | 102344592 A | 2/2012 |
| CN | 202148274 U | 2/2012 |
| CN | 102816343 A | 12/2012 |
| CN | 102888030 A | 1/2013 |
| CN | 102977404 A | 3/2013 |
| CN | 103087349 A | 5/2013 |
| CN | 203007189 U | 6/2013 |
| CN | 203048848 U | 7/2013 |
| CN | 203079895 | 7/2013 |
| CN | 203794822 U | 8/2014 |
| GB | 2053013 | 2/1981 |
| WO | 2012142562 A1 | 10/2012 |

OTHER PUBLICATIONS

Capelle, G., "Der Stiftzylinder-Extrudel in Versuch und Praxis," 2297 Gummi.Asbest.Kunststoffe, 36 (Jun. 1983), No. 6, Stuttgart, Deutschland (XP-001353806).
European Patent Office, Supplementary European Search Report dated Oct. 12, 2017, issued in connection with EP Patent Application No. 14884372, 11 pages.
International Search Report and Written Opinion for corresponding PCT application No. PCT/CN2014/090358, dated Feb. 6, 2015.
International Preliminary Report on Patentability for corresponding PCT application No. PCT/CN2014/090358, dated Sep. 6, 2016.

* cited by examiner

SINGLE-SCREW EXTRUSION DESULFURIZATION AND POST-PROCESSING SYSTEM, AND METHOD FOR PREPARING RECLAIMED RUBBER

CROSS-REFERENCE TO RELATED APPLICATIONS

This application is a U.S. national phase application of International Patent Application no. PCT/CN2014/090358, now WO 2015/131526, filed on Nov. 5, 2014, which claims the benefit of Chinese Patent Application no. CN 201410080452.5, filed on Mar. 6, 2014.

TECHNICAL FIELD

Embodiments of the present invention relate to desulfurization for preparing reclaimed rubber using waste rubber and post-processing device and related technique method. Specifically, embodiments of the present invention relate to a single-screw extrusion desulfurization and post-processing system and a method for preparing reclaimed rubber.

BACKGROUND

The desulfurization process of waste rubber is to convert waste rubber in elastic state into plastic, viscous and resulfurized rubber after physical and chemical processes such as grinding, heating and mechanical treatment. In the process, S—S and S—C bonds are opened by physical means, chemical means or other means and C—C bonds are not damaged as much as possible; a three-dimensional cross-linked network structure is optionally damaged, but C—C backbone chains are not broken as much as possible; and sulfurized rubber is returned into non-sulfurized rubber.

Currently, the desulfurization of waste rubber at home and abroad mainly adopts two means: the first means is to adopt a dynamic desulfurization device (generally a high-pressure desulfurization tank) for desulfurization and subsequently adopt three or four open mill tabletting devices for post-processing, namely a manufacturing process of one machine and three lines or one machine and four lines is adopted; and the second means is to adopt a spiral continuous desulfurization device for desulfurization and subsequently adopt three or four open mill tabletting devices for post-processing, namely a manufacturing process of new one machine and three lines or new one machine and four lines is adopted.

The first means has the problems of serious pollution, high energy consumption, large labor intensity, instable quality and low efficiency; the high-pressure desulfurization tank has potential safety hazard; and the dynamic desulfurization device and open mills have complex structure, high operation cost and large occupation of land. The second means achieves continuous desulfurization production and has low pollution degree; but as the desulfurization process is spiral free transport process and spiral structures only convey materials forwards in the desulfurization process, S—S and S—C bonds cannot be broken physically; as only thermochemical reaction function is adopted and forced shearing function is not adopted, the desulfurization efficiency is low; the spiral desulfurization device has the defects of large volume, complex structure, difficulty in maintenance, low operation reliability, high operation cost and high energy consumption; the materials are in laminar state in cylinders, are not uniformly heated, and can be easily adhered to blades, so that the quality is instable; and the accumulation of the materials on the blades will also result in explosive problem, and hence the safety performance is low.

The two means adopt three or four open mills for the post-processing of desulfurized rubber, not only have cumbersome processes, large labor intensity and high consumed power but also release a large amount of PM2.5 tail gas in the open mill tabletting process and hence result in air pollution.

The Chinese patent application CN201210422570.0 discloses a device for continuously preparing reclaimed rubber by a two-stage double screw extruder. The device comprises a heterodromous double screw extruder for desulfurization and a homodromous double screw extruder for post-processing. The heterodromous double screw extruder having the advantages of high transport capability and low shearing force is adopted to replace dynamic desulfurization and multispiral desulfurization; the homodromous double screw extruder having the advantage of high shearing force is adopted to replace refining mills by applying high shearing force in low temperature; and finally the reclaimed rubber is obtained by extrusion from heads. In the technology, the heterodromous double screw extruder is adopted for desulfurization; waste rubber is subjected to the engagement of two screws during transport; not only S—S and S—C bonds are broken but also C—C bonds of backbone chains can be easily broken, so that the desulfurized reclaimed rubber has low intensity, and hence the application range and the performance of subsequent reclaimed rubber can be limited; the homodromous double screw extruder is adopted for post-processing and has the defects of complex structure, difficulty in production, high production cost and difficulty in maintenance; and meanwhile, as the materials cannot be easily cooled, an additional cooling means must be arranged to cool the materials from high temperature during desulfurization.

The Chinese patent application CN201310005753.7 discloses a waste rubber desulfurization device and a desulfurization method thereof. A screw with forced shearing function is mounted in a feeding section cylinder and a desulfurizing section cylinder of the device; a two-stage or multistage single-screw desulfurization device is adopted to replace dynamic desulfurization and multispiral desulfurization; and in the desulfurization process, thermochemical and shearing functions are simultaneously applied. Moreover, the device overcomes the defects of difficulty of double screws in controlling the shearing function and complex structure, improves the working stability and reliability, reduces the occupation of land, the energy consumption and the operation cost, and achieves green desulfurization process. The technology adopts the single-screw extruder to achieve the desulfurization of waste rubber, but a matched post-processing device is not provided, so the means of one machine and three lines or new one machine and four lines must be still adopted. The traditional three or four open mills are adopted for the post-processing of the desulfurized rubber, so the defects of the post-processing means still exist.

SUMMARY

In order to solve the problems in the prior art of complex structure, difficulty in production, high production cost, difficulty in maintenance, and the requirement of arranging an additional cooling means as the materials cannot be easily cooled when the post-processing device adopts the homodromous double screw extruder, the embodiments of the present invention provide a single-screw extrusion, continuous desulfurization and post-processing system. The system comprises: a single-screw desulfurization device. The single-screw desulfurization device includes a desulfurizing feeding unit and a desulfurizing unit which are connected with each other, and a desulfurizing screw running through the desulfurizing feeding unit and the desulfurizing unit. A heating structure is respectively disposed in the desulfurizing feeding unit, the desulfurizing unit and the desulfurizing screw. The system further comprises: a single-screw post-processing device and a closed connection device for connecting the single-screw desulfurization device and the single-screw post-processing device. The single-screw post-processing device includes a post-processing feeding unit and a post-processing unit which are connected with each other, and a post-processing screw running through the post-processing feeding unit and the post-processing unit.

The embodiment of the present invention adopts the technical proposal of the Chinese patent application CN201310005753.7 in the aspect of desulfurization, adopts the single-screw desulfurization device for desulfurization, overcomes the defects of low desulfurization efficiency and influence on the desulfurization effect as dynamic desulfurization and spiral desulfurization means mainly adopt thermochemical reaction, and improves the desulfurization effect as thermochemical reaction and shearing force are simultaneously applied in the desulfurization process. Compared with double-screw structures and multispiral structures, the single-screw extrusion and desulfurization device has the advantages of significantly reduced volume, simple structure, easy production, low operation cost and energy-saving and cost-reducing properties. Moreover, which is even more critical, during single-screw desulfurization, the materials uniformly run through thread surfaces, and each particle will be subjected to heat transfer with the cylinder; the shearing strength is suitable; S—S and S—C bonds can be broken but C—C backbone chains cannot be damaged; and hence effective desulfurization is guaranteed and the intensity of the reclaimed rubber is less reduced.

In the aspect of post-processing, the embodiment of the present invention adopts the single-screw extrusion and post-processing device to achieve low-temperature shearing post-processing of waste rubber, can be used together with the traditional high-temperature desulfurization device, the traditional spiral desulfurization device and the traditional double-screw desulfurization device, changes the means in the prior art that three or four open mills are adopted for the post-processing of the desulfurized rubber, changes the traditional intermittent post-processing process, and achieves the continuous execution of the desulfurization process and the post-processing process. Moreover, as different from the double-screw extrusion and post-processing device in the prior art, the flow means of the materials in the cylinders not only includes axial laminar flow but also includes radial motion, so the materials make full contact with the cylinders, and hence the contact area is large and the cooling process of the materials is accelerated. Thus, no additional cooling means is required in the embodiment of the present invention, and the cooling process can be achieved only by allowing the materials to run through the post-processing unit.

Optionally, the desulfurizing unit includes a desulfurizing feeding cylinder and at least one stage of desulfurizing cylinder; the desulfurizing feeding cylinder is connected with the first-stage desulfurizing cylinder; and the desulfurizing screw runs through the desulfurizing feeding cylinder and the desulfurizing cylinder. The desulfurizing screw is a full-pin screw, a full major-minor thread screw, a pin/major-minor thread screw or a pin/major-minor thread interphase screw. The number of rows of pins, the number of sections of major-minor threads and the number of stages of pins/major-minor threads on each desulfurizing screw may be varied when designed according to the technological requirements. The length-to-diameter ratio of the desulfurizing screw is greater than 16. In the full-pin screw, pins of the desulfurizing cylinder are inserted into screw slots of the desulfurizing screw. The embodiment of the present invention adopts the desulfurization single screw with special structure, adopts the major-minor thread interphase and/or pin structure, increases the shearing force of the materials in the cylinders, improves the mixed shearing function of the single-screw extruder, improves the desulfurization efficiency of waste rubber, improves the self-cleaning property as the engagement of two screws does not exist, and can ensure the intensity of the desulfurized reclaimed rubber as the C—C backbone chains cannot be broken due to the intensity.

Optionally, the desulfurizing and feeding unit includes a desulfurizing feeding spiral roller disposed in the desulfurizing and feeding cylinder. The desulfurizing and feeding spiral roller may be designed to be cylindrical or conical, is correspondingly matched with the desulfurizing screw, and is engaged with the desulfurizing screw. The lead or the pitch of threads of the desulfurizing and feeding spiral roller and threads of the desulfurizing screw corresponds to each other. The direction of the threads of the desulfurizing and feeding spiral roller is opposite to the direction of the threads of the desulfurizing screw. The embodiment of the present invention adopts a spiral engagement feeder, overcomes the defects of poor effect in the traditional single-screw extrusion and feeding process and low production efficiency, ensures smooth feeding process, is combined with the single-screw structure with superior self-cleaning performance, ensures the forced transport function in the desulfurization process, not only improves the production efficiency in the desulfurization process but also achieves the self-cleaning function in the desulfurization process, and avoids the influence of the use reliability of the device and the difficulty in maintenance due to the scorching and bonding of materials as high-temperature materials stop on spiral blades or screw flights.

Optionally, the post-processing unit includes a post-processing feeding cylinder and a post-processing cooling cylinder. The post-processing screw runs through the post-processing feeding cylinder and the post-processing cooling cylinder. The post-processing screw is a full-pin screw, a full major-minor thread screw, a pin/major-minor thread screw or a pin/major-minor thread interphase screw. The number of rows of pins, the number of sections of major-minor threads and the number of stages of pins/major-minor threads on each post-processing screw may be varied when designed according to the technological requirements. The length-to-diameter ratio of the post-processing screw is less than 42. In the full-pin screw, pins of the post-processing cylinder are inserted into screw slots of the post-processing screw. The embodiment of the present invention adopts a post-processing single screw with special structure, allows the materials to enter gaps of the major-minor threads, compared with the double-screw extrusion post-processing device, increases the axial shearing and contact area, accelerates the cooling of the materials, and can achieve post-processing effect without an additional cooling means; the use of the pins can increase a heat dissipation channel, brings a radial shearing force, achieves the function of material stirring, and simultaneously improves the cooling effect and the post-processing effect. As the single-screw with the above structure is adopted, multistage milling is adopted in the post-processing unit. As the materials make full contact with the cylinders, the major-minor threads and/or the pins, the milling and cooling effect can be improved and the post-processing and cooling effect can be improved as well.

Optionally, the post-processing and feeding unit includes a post-processing feeding spiral roller disposed in the post-processing feeding cylinder. The post-processing feeding spiral roller may be designed to be cylindrical or conical, is correspondingly matched with the post-processing screw, and is engaged with the post-processing screw. The lead or the pitch of threads of the post-processing and feeding spiral roller and threads of the post-processing screw corresponds to each other. The direction of the threads of the post-processing feeding spiral roller is opposite to the direction of the threads of the post-processing screw. As the same with the desulfurization and engagement feeding unit in the embodiment of the present invention, the post-processing unit also adopts engagement feeding means, so that the effective connection between the desulfurizing device and the post-processing device can be guaranteed, and hence the post-processing production efficiency can be improved.

Optionally, the closed connection device includes a connecting tray connected with an outlet of the desulfurizing unit, a closed box connected with a feed inlet of the post-processing unit, and a conveying pipe disposed between the connecting tray and the closed box. The system provided by the embodiment of the present invention may connect the desulfurizing unit and the post-processing unit by linear connection means or any other means according to production sites or process layout, and correspondingly, the shape and the connection means of the connecting tray and the closed box may be adjusted according to actual demands.

Optionally, the system is connected with a first reduction gearbox and a second reduction gearbox; the desulfurizing screw is connected to a main shaft of the first reduction gearbox, and the first reduction gearbox drives the desulfurizing screw to rotate; and the post-processing screw is connected to a main shaft of the second reduction gearbox, and the second reduction gearbox drives the post-processing screw to rotate.

The embodiment of the present invention further provides a method for preparing reclaimed rubber by the single-screw extrusion, desulfurization and post-processing system, which comprises: heating the desulfurizing unit to the temperature required by the desulfurization process of the reclaimed rubber; allowing the desulfurizing screw to rotate; adding waste rubber into the single-screw extrusion, desulfurization and post-processing system through the desulfurizing and feeding unit; conveying materials processed by the thermochemical function and the forced shearing function of the desulfurizing unit to the post-processing feeding unit; and allowing the materials to be milled by the post-processing screw and cooled and discharged out of the system from the post-processing unit.

The beneficial effects of embodiments of the present invention are as follows.

The embodiment of the present invention overcomes the defect of high pollution in the prior art. In the embodiment of the present invention, vapor and water do not participate in thermochemical desulfurization; both the desulfurization process and the post-processing process are performed in a totally enclosed system; the reclaimed rubber after post-processing has low temperature; and no waste gas is generated, so that the defect of secondary pollution of waste gas and waste water is overcome, and hence "green" desulfurization and post-processing process can be achieved.

In addition, the embodiment of the present invention only adopts one single-screw extrusion and continuous post-processing device, overcomes the defects of high energy consumption, large floor area, serious tail gas pollution, large labor intensity, low production efficiency and high operation cost due to the post-processing technology of three or four open mills, greatly simplifies the desulfurization and post-processing process, has low energy consumption and small floor area, can achieve continuous automatic production, has high working stability and reliability, effectively improves the production efficiency of desulfurization and post-processing, and reduces the operation cost of the device.

Moreover, the embodiment of the present invention overcomes the defect that in the conventional desulfurization technology, as the desulfurization process only produces thermochemical reaction, the desulfurization effect can be affected. In the embodiment of the present invention, the desulfurization process not only ensures the thermochemical reaction function but also adopts a single screw with special shearing function to apply high forced shearing force to the desulfurized materials, can effectively damage the S—S and S—C bonds in the desulfurized rubber powder and improve the desulfurization effect in the expansion and enhancement of the thermochemical reaction of the materials, and hence can effectively improve the quality of the desulfurized reclaimed rubber and ensure the quality stability between batches of the desulfurized reclaimed rubber, and the performances of the desulfurized reclaimed rubber cannot be rebounded.

The embodiment of the present invention adopts the spiral engagement feeding unit and method and the single-screw structure with superior self-cleaning performance, ensures the forced transport function in the desulfurization process and the post-processing process, not only improves the production efficiency in the desulfurization process and the post-processing process but also achieves the self-cleaning performance in the desulfurization process and the post-processing process, and avoids the influence of the use reliability of the device and the difficulty in maintenance due to the scorching and bonding of materials as high-temperature materials stop on spiral blades or screw flights in the prior art.

The embodiment of the present invention adopts the single-screw structure with simple structure, not only achieves continuous desulfurization function and continuous post-processing function but also has the advantages of significantly reduced volume, simple structure, reliable operation, easy production, low operation cost and energy-saving and cost-reducing properties compared with the conventional desulfurization device with double screw structure and multispiral structure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention. Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one.

Figure 1:
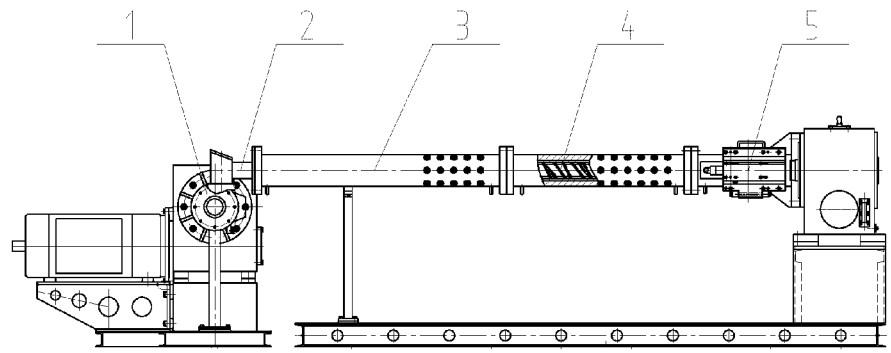
FIG. 1 is a schematic structural view of a single-screw extrusion desulfurization and post-processing system.
Figure 2:
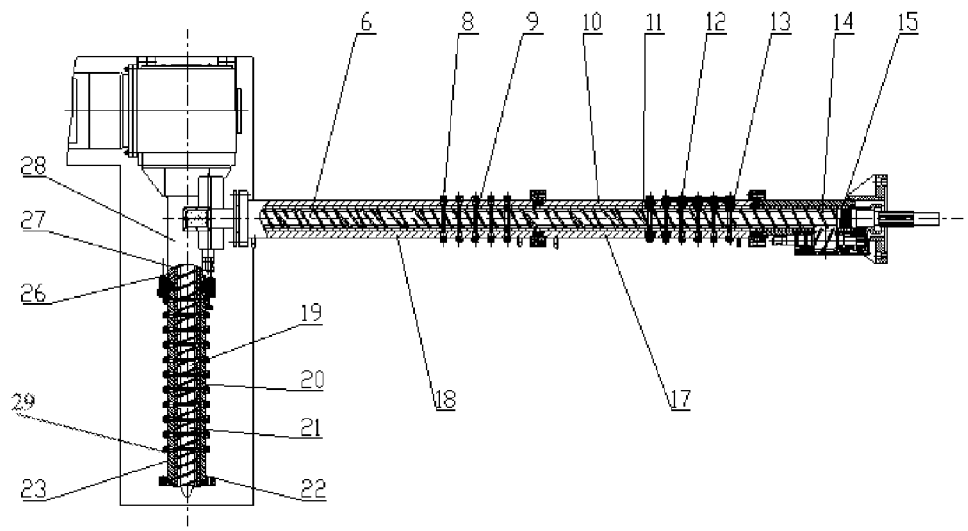
FIG. 2 is a top view of FIG. 1.

As illustrated in FIGS. 1 and 2, the single-screw extrusion desulfurization and post-processing system comprises a single-screw desulfurization device 3, a single-screw post-processing device 1, and a closed connection device 2 for connecting the single-screw desulfurization device 3 and the single-screw post-processing device 1.

The single-screw desulfurization device 3 includes a desulfurizing and feeding unit 5 and a desulfurizing unit 4 which are connected with each other, and a desulfurizing screw 6 running through the desulfurizing and feeding unit 5 and the desulfurizing unit 4. The desulfurizing screw 6 is connected to a main shaft of a first reduction gearbox on the outside of the single-screw extrusion desulfurization and post processing system, and the first reduction gearbox is configured to drive the desulfurizing screw 6 to rotate. A heating structure is respectively disposed in the desulfurizing and feeding unit 5, the desulfurizing unit 4 and the desulfurizing screw 6. The desulfurizing unit 4 includes a desulfurizing and feeding cylinder 15, a first-stage desulfurizing cylinder 17 and a second-stage desulfurizing cylinder 18. The desulfurizing and feeding cylinder 15 is connected with the first-stage desulfurizing cylinder 17. The desulfurizing screw 6 runs through the desulfurizing and feeding cylinder 15 and the two-stage desulfurizing cylinders. The desulfurizing cylinder includes a desulfurizing cylinder body 10 and a desulfurizing cylinder liner 11.

The length-to-diameter ratio of the desulfurizing screw is greater than 16. The desulfurizing screw may be a full-pin screw 30, a full major-minor thread screw 32, a pin/major-minor thread screw 35 or a pin/major-minor thread interphase screw 38.

Figure 3:
FIG. 3 is a schematic structural view a full-pin screw.

In the full-pin screw 30 as shown in FIG. 3, a plurality of rows of pin slots 31 are formed on the screw and matched with pins inserted into the desulfurizing cylinder. The number of rows of pins may be varied when designed according to the technological requirements.

Figure 4:
FIG. 4 is a schematic structural view of a full major-minor screw.

In the full major-minor thread screw 32 as shown in FIG. 4, major threads 33 and minor threads 34 are disposed on the screw. There is height difference between the outside diameter of the major thread 33 and the outside diameter of the minor thread 34. The major-minor thread structure not only has thread transport function but also has shearing function. The number of sections of the major-minor threads may be varied when designed according to the technological requirements.

Figure 5:
FIG. 5 is a schematic structural view of a pin/major-minor thread screw.

Major-minor threads 36 and pin slots 31 are formed on the pin/major-minor thread screw 35 as shown in FIG. 5. The pin slots 31 are matched with the pins inserted into the desulfurizing cylinder. The number of rows of pins and the number of sections of major-minor threads may be varied when designed according to different technological requirements.

Figure 6:
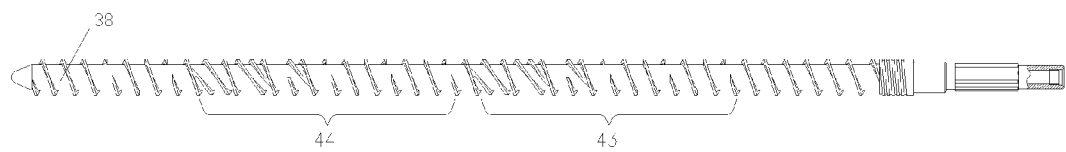
FIG. 6 is a schematic structural view of a pin/major-minor thread interphase screw.

In the pin/major-minor thread interphase screw 38 as shown in FIG. 6, first-stage pin/major-minor threads 43 and second-stage pin/major-minor threads 44 are disposed on the screw. Multistage pin/major-minor threads may be disposed. The number of rows of pins in each stage may be varied, and the number of sections of major-minor threads in each stage may be varied.

As illustrated in FIG. 2, when the desulfurizing screw 6 has a pin structure, first-stage desulfurizing cylinder pins 12 and second-stage desulfurizing cylinder pins 8 are respectively inserted into first-stage desulfurizing screw pin slots 13 and second-stage desulfurizing screw pin slots 9 of the desulfurizing screw 6.

Figure 7:
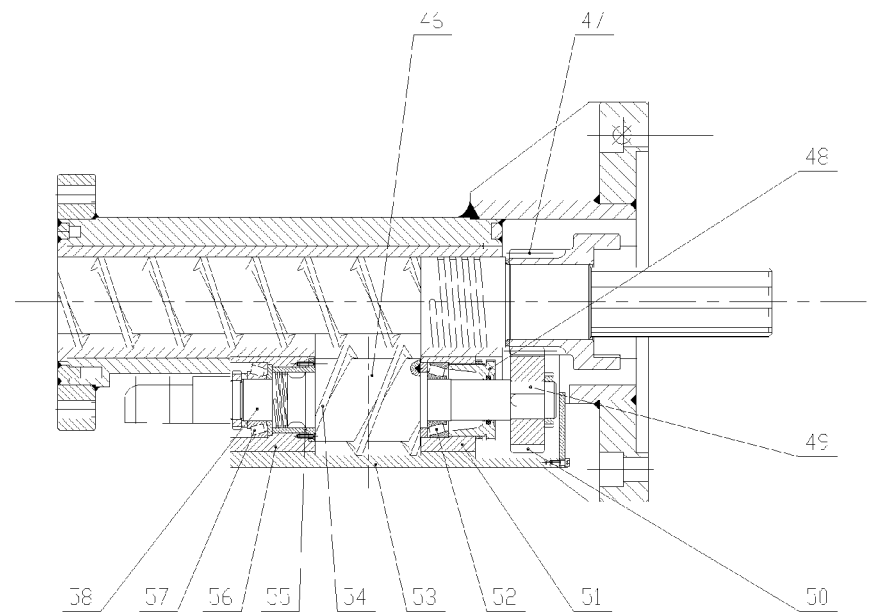
FIG. 7 is a schematic structural view of feeders of a desulfurizing unit and a post-processing unit.

As illustrated in FIG. 7, the desulfurizing and feeding unit 5 includes a support 53 fixed on the desulfurizing and feeding cylinder 15; a desulfurizing and feeding spiral roller 46 is mounted in the support 53; spiral roller threads 54 of which the lead or the pitch corresponds to that of desulfurizing screw threads 14 in the desulfurizing and feeding cylinder are disposed on a surface of the desulfurizing and feeding spiral roller 46; the direction of the spiral roller threads 54 is opposite to the direction of the desulfurizing screw threads 14 in the desulfurizing and feeding cylinder; and the spiral roller threads 54 are engaged with the desulfurizing screw threads 14 in the desulfurizing and feeding cylinder.

A left bearing 57 is mounted on a left shaft 58 of the desulfurizing and feeding spiral roller 46; the left bearing 57 is mounted on a left bearing support 56; a wear-resistant bushing 55 is mounted on a right end face of the left bearing support 56; a right end face of the wear-resistant bushing 55 and a left end face of the desulfurizing and feeding spiral roller 46 are subjected to micro-clearance fit; an inner hole of the wear-resistant bushing 55 runs through the left of the desulfurizing and feeding spiral roller 46 and is fixed on the left bearing support 56; a right bearing 52 is mounted on a right shaft 49 of the desulfurizing and feeding spiral roller 46; the right bearing 52 is mounted on a right bearing support 51; an adjusting nut 48 is disposed on a right end of the right bearing support 51; and a desulfurizing and feeding spiral roller drive gear 50 engaged with an extruder screw drive gear 47 is mounted at the tail of the right shaft 49 of the desulfurizing and feeding spiral roller 46. When the feeder operates, the desulfurizing and feeding spiral roller 46 and the desulfurizing screw 6 are subjected to relative motion, so that the spiral engagement feeding means can be achieved.

The single-screw post-processing device 1 includes a post-processing feeding unit 21 and a post-processing unit 29 which are connected with each other, and a post-processing screw 19 running through the post-processing feeding unit 21 and the post-processing unit 29. The post-processing screw 19 is connected to a main shaft of a second reduction gearbox on the outside of the single-screw extrusion desulfurization and post-processing system, and the second reduction gearbox drives the post-processing screw 19 to rotate. The post-processing unit 29 includes a post-processing feeding cylinder 28 and a post-processing cooling barrel 20. The post-processing screw 19 runs through the post-processing feeding cylinder and the post-processing cooling cylinder. The post-processing cooling cylinder 20 includes a post-processing cylinder body 23 and a post-processing cylinder liner 22. The post-processing feeding cylinder 28 includes a feeding cylinder body 26 and a feeding cylinder liner 27.

The post-processing screw 19 has the same structure but shorter length than the desulfurizing screw 6. The length-to-diameter ratio of the screw is less than 42. The screw may be a full-pin screw 30, a full major-minor thread screw 32, a pin/major-minor thread screw 35 or a pin/major-minor thread interphase screw 38.

The post-processing feeding unit 31 and the desulfurizing feeding unit 5 have same structure. The post-processing feeding unit includes a support fixed on the post-processing feeding cylinder; the post-processing feeding spiral roller is mounted in the support and engaged with the post-processing screw; the lead or the pitch of threads of the post-processing feeding spiral roller and threads of the post-processing screw corresponds to each other; and the direction of the threads of the post-processing feeding spiral roller is opposite to the direction of the threads of the post-processing screw. The threads of the post-processing feeding spiral roller and the threads of the post-processing screw in the post-processing feeding cylinder are subjected to non-tight engagement.

Figure 8:
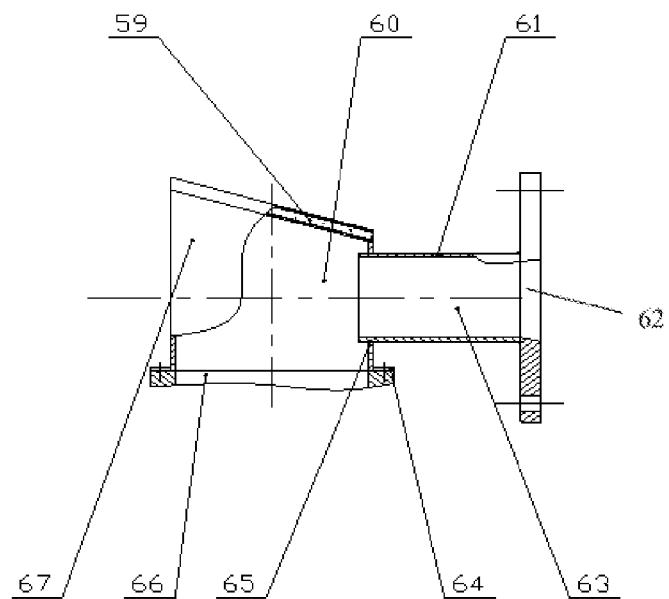
FIG. 8 is a schematic structural view of a closed connection device.

As illustrated in FIG. 8, the closed connection device 2 includes a connecting tray 62 connected with an outlet of the desulfurizing unit, a closed box 60 connected with a feed inlet 66 of the post-processing unit, and a conveying pipe 61 disposed between the connecting tray 62 and the closed box 60. A tray body 63 connected with the desulfurizing unit 3 includes the connecting tray 62 and the conveying pipe 61. The closed box 60 is a box body 67 which is connected to the feed inlet 66 of the post-processing unit via a base 64; a movable window 59 is disposed on a top surface of the closed box 60; a circular hole 65 is formed on the right of the closed box 60; and the conveying pipe 61 corresponding to the connecting tray 62 runs through the circular hole 65 and enters the feed inlet 66 of the post-processing unit.

In the initial state of the desulfurization and post-processing process, when the desulfurizing device is heated to the temperature required by the process, the desulfurizing screw begins to rotate; matched desulfurized rubber powder is fed into the desulfurizing feeding unit; under the action of the desulfurizing feeding unit, the materials of desulfurized rubber powder is continuously inputted into the desulfurizing device; and the materials in the device are continuously subjected to thermochemical function and forced shearing function, so that S—S and S—C bonds in the materials are broken, and hence the desulfurized reclaimed rubber is obtained. When the desulfurized reclaimed rubber is close to an outlet of the extrusion desulfurization system, the post-processing device is switched on; the post-processing screw begins to rotate; the desulfurized reclaimed rubber enters the post-processing feeding unit through the closed connection device; the desulfurized reclaimed rubber enters the post-processing unit continuously; and high-temperature desulfurized reclaimed rubber after desulfurization are subjected to the action of the post-processing unit, so that the desulfurized reclaimed rubber is milled and simultaneously fully cooled and hence extruded out of the machine from the post-processing device. Thus, the desulfurization process and the post-processing process are finished. The above technological processes are continuous and may be cyclical and continuous operation.

The embodiment of the present invention overcomes the defect of high pollution in the prior art. In the embodiment of the present invention, vapor and water do not participate in thermochemical desulfurization; both the desulfurization process and the post-processing process are performed in a totally enclosed system; the reclaimed rubber after post-processing has low temperature; and no waste gas is generated, so that the defect of secondary pollution of waste gas and waste water is overcome, and hence "green" desulfurization and post-processing process can be achieved.

In addition, the embodiment of the present invention only adopts one single-screw extrusion and continuous post-processing device, overcomes the defects of high energy consumption, large floor area, serious tail gas pollution, large labor intensity, low production efficiency and high operation cost due to the post-processing technology of three or four open mills, greatly simplifies the desulfurization and post-processing process, has low energy consumption and small floor area, can achieve continuous automatic production, has high working stability and reliability, effectively improves the production efficiency of desulfurization and post-processing, and reduces the operation cost of the device.

Moreover, the embodiment of the present invention overcomes the defect that in the conventional desulfurization technology, as the desulfurization process only produces thermochemical reaction, the desulfurization effect can be affected. In the embodiment of the present invention, the desulfurization process not only ensures the thermochemical reaction function but also adopts a single screw with special shearing function to apply high forced shearing force to the desulfurized materials, can effectively damage the S—S and S—C bonds in the desulfurized rubber powder and improve the desulfurization effect in the expansion and enhancement of the thermochemical reaction of the materials, and hence can effectively improve the quality of the desulfurized reclaimed rubber and ensure the quality stability between batches of the desulfurized reclaimed rubber, and the performances of the desulfurized reclaimed rubber cannot be rebounded.

The embodiment of the present invention adopts the spiral engagement feeding unit and method and the single-screw structure with superior self-cleaning performance, ensures the forced transport function in the desulfurization process and the post-processing process, not only improves the production efficiency in the desulfurization process and the post-processing process but also achieves the self-cleaning performance in the desulfurization process and the post-processing process, and avoids the influence of the use reliability of the device and the difficulty in maintenance due to the scorching and bonding of materials as high-temperature materials stop on spiral blades or screw flights in the prior art.

The embodiment of the present invention adopts the single-screw structure with simple structure, not only achieves continuous desulfurization function and continuous post-processing function but also has the advantages of significantly reduced volume, simple structure, reliable operation, easy production, low operation cost and energy-saving and cost-reducing properties compared with the conventional desulfurization device with double screw structure and multispiral structure.

The foregoing is only the preferred embodiments of the present invention and not intended to limit the scope of protection of the present invention. The scope of protection of the present invention should be defined by the appended claims.

What is claimed is:

1. A single-screw extrusion desulfurization and post-processing system, wherein
the system comprises: a single-screw desulfurization device;
the single-screw desulfurization device includes a desulfurizing feeding unit and a desulfurizing unit which are connected with each other, and a desulfurizing screw running through the desulfurizing feeding unit and the desulfurizing unit; and
a heating structure is respectively disposed in the desulfurizing feeding unit, the desulfurizing unit and the desulfurizing screw; and wherein
the system further comprises: a single-screw post-processing device and a closed connection device for connecting the single-screw desulfurization device and the single-screw post-processing device;
the single-screw post-processing device includes a post-processing feeding unit and a post-processing unit which are connected with each other, and a post-processing screw running through the post-processing feeding unit and the post-processing unit.

2. The single-screw extrusion desulfurization and post-processing system according to claim 1, wherein
the desulfurizing unit includes a desulfurizing feeding cylinder and at least one stage of desulfurizing cylinder; the desulfurizing feeding cylinder is connected with the at least one stage of desulfurizing cylinder; and the desulfurizing screw runs through the desulfurizing feeding cylinder and the at least one stage of desulfurizing cylinder.

3. The single-screw extrusion desulfurization and post-processing system according to claim 2, wherein
the desulfurizing feeding unit includes a desulfurizing feeding spiral roller disposed in the desulfurizing feeding cylinder; the desulfurizing feeding spiral roller is engaged with the desulfurizing screw; the lead and/or the pitch of threads of the desulfurizing feeding spiral roller and threads of the desulfurizing screw corresponds to each other; and the direction of the threads of the desulfurizing feeding spiral roller is opposite to the direction of the threads of the desulfurizing screw.

4. The single-screw extrusion desulfurization and post-processing system according to claim 3, wherein
the post-processing device includes a post-processing feeding cylinder and a post-processing cooling cylinder; and
the post-processing screw runs through the post-processing feeding cylinder and the post-processing cooling cylinder.

5. The single-screw extrusion desulfurization and post-processing system according to claim 3, wherein
the closed connection device includes a connecting tray connected with an outlet of the desulfurizing unit, a closed box connected with a feed inlet of the post-processing unit, and a conveying pipe disposed between the connecting tray and the closed box.

6. The single-screw extrusion desulfurization and post-processing system according to claim 2, wherein
the post-processing device includes a post-processing feeding cylinder and a post-processing cooling cylinder; and
the post-processing screw runs through the post-processing feeding cylinder and the post-processing cooling cylinder.

7. The single-screw extrusion desulfurization and post-processing system according to claim 2, wherein
the closed connection device includes a connecting tray connected with an outlet of the desulfurizing unit, a closed box connected with a feed inlet of the post-processing unit, and a conveying pipe disposed between the connecting tray and the closed box.

8. The single-screw extrusion desulfurization and post-processing system according to claim 2, wherein
the system is connected with a first reduction gearbox and a second reduction gearbox;
the desulfurizing screw is connected to a main shaft of the first reduction gearbox, and the first reduction gearbox drives the desulfurizing unit to rotate; and
the post-processing screw is connected to a main shaft of the second reduction gearbox, and the second reduction gearbox drives the post-processing screw to rotate.

9. The single-screw extrusion desulfurization and post-processing system according to claim 1, wherein
the post-processing device includes a post-processing feeding cylinder and a post-processing cooling cylinder; and
the post-processing screw runs through the post-processing feeding cylinder and the post-processing cooling cylinder.

10. The single-screw extrusion desulfurization and post-processing system according to claim 9, wherein
the post-processing feeding device includes a post-processing feeding spiral roller disposed in the post-processing feeding cylinder; the post-processing feeding spiral roller is engaged with the post-processing screw; the lead and/or the pitch of threads of the post-processing feeding spiral roller and threads of the post-processing screw corresponds to each other; and the direction of the threads of the post-processing feeding spiral roller is opposite to the direction of the threads of the post-processing screw.

11. The single-screw extrusion desulfurization and post-processing system according to claim 9, wherein
the closed connection device includes a connecting tray connected with an outlet of the desulfurizing unit, a closed box connected with a feed inlet of the post-processing unit, and a conveying pipe disposed between the connecting tray and the closed box.

12. The single-screw extrusion desulfurization and post-processing system according to claim 1, wherein
both the desulfurizing screw and the post-processing screw are full-pin screws, full-major-minor thread screws, pin/major-minor thread screws or pin/major-minor thread interphase screws.

13. The single-screw extrusion desulfurization and post-processing system according to claim 12, wherein
the post-processing feeding device includes a post-processing feeding spiral roller disposed in the post-processing feeding cylinder; the post-processing feeding spiral roller is engaged with the post-processing screw; the lead and/or the pitch of threads of the post-processing feeding spiral roller and threads of the post-processing screw corresponds to each other; and the direction of the threads of the post-processing feeding spiral roller is opposite to the direction of the threads of the post-processing screw.

14. The single-screw extrusion desulfurization and post-processing system according to claim 1, wherein
a length-diameter ratio of the desulfurizing screw is greater than 16.

15. The single-screw extrusion desulfurization and post-processing system according to claim 14, wherein
the post-processing feeding device includes a post-processing feeding spiral roller disposed in the post-processing feeding cylinder; the post-processing feeding spiral roller is engaged with the post-processing screw; the lead and/or the pitch of threads of the post-processing feeding spiral roller and threads of the post-processing screw corresponds to each other; and the direction of the threads of the post-processing feeding spiral roller is opposite to the direction of the threads of the post-processing screw.

16. The single-screw extrusion desulfurization and post-processing system according to claim 1, wherein
the length-diameter ratio of the post-processing screw is less than 42.

17. The single-screw extrusion desulfurization and post-processing system according to claim 16, wherein
the post-processing feeding device includes a post-processing feeding spiral roller disposed in the post-processing feeding cylinder; the post-processing feeding spiral roller is engaged with the post-processing screw; the lead and/or the pitch of threads of the post-processing feeding spiral roller and threads of the post-processing screw corresponds to each other; and the direction of the threads of the post-processing feeding spiral roller is opposite to the direction of the threads of the post-processing screw.

18. The single-screw extrusion desulfurization and post-processing system according to claim 1, wherein
the closed connection device includes a connecting tray connected with an outlet of the desulfurizing unit, a closed box connected with a feed inlet of the post-processing unit, and a conveying pipe disposed between the connecting tray and the closed box.

19. The single-screw extrusion desulfurization and post-processing system according to claim 1, wherein
the system is connected with a first reduction gearbox and a second reduction gearbox;
the desulfurizing screw is connected to a main shaft of the first reduction gearbox, and the first reduction gearbox drives the desulfurizing unit to rotate; and
the post-processing screw is connected to a main shaft of the second reduction gearbox, and the second reduction gearbox drives the post-processing screw to rotate.

20. A method for preparing reclaimed rubber by the single-screw extrusion desulfurization and post-processing system according to claim 1, comprising:
heating the desulfurizing unit to the temperature required by the desulfurization process of the reclaimed rubber;
allowing the desulfurizing screw to rotate;
adding waste rubber into the single-screw extrusion desulfurization and post-processing system through a desulfurizing feeding unit;
conveying materials processed by the thermochemical function and the forced shearing function of the desulfurizing unit to the post-processing and feeding unit; and
allowing the materials to be milled by the post-processing screw and cooled and discharged out of the system from the post-processing unit.

\* \* \* \* \*